(12) United States Patent
Hui

(10) Patent No.: US 10,645,981 B2
(45) Date of Patent: May 12, 2020

(54) MANUFACTURING METHOD OF A PROTECTIVE PAD FOR SPORTSWEAR AND THE PROTECTIVE PAD OBTAINED ACCORDING TO THE MANUFACTURING METHOD

(71) Applicant: Han Dan Geni Hui, Hong Kong (CN)

(72) Inventor: Han Dan Geni Hui, Hong Kong (CN)

( * ) Notice: Subject to any disclaimer, the term of this patent is extended or adjusted under 35 U.S.C. 154(b) by 530 days.

(21) Appl. No.: 15/510,236

(22) PCT Filed: Dec. 1, 2015

(86) PCT No.: PCT/CN2015/096135
§ 371 (c)(1),
(2) Date: Mar. 10, 2017

(87) PCT Pub. No.: WO2016/086843
PCT Pub. Date: Jun. 9, 2016

(65) Prior Publication Data
US 2017/0295863 A1    Oct. 19, 2017

(30) Foreign Application Priority Data

Dec. 5, 2014   (CN) .......................... 2014 1 0739966

(51) Int. Cl.
A41D 31/28    (2019.01)
B29C 70/46    (2006.01)
(Continued)

(52) U.S. Cl.
CPC ......... *A41D 13/0158* (2013.01); *A41D 1/088* (2013.01); *A41D 13/05* (2013.01);
(Continued)

(58) Field of Classification Search
CPC .... A41D 13/0158; A41D 13/05; A41D 1/088; A41D 2600/10; A41D 31/285;
(Continued)

(56) References Cited

U.S. PATENT DOCUMENTS

D309,805 S  *  8/1990  Shelby ...................... D29/121.1
6,070,273 A  *  6/2000  Sgro .................. A41D 13/0153
                                                        2/455

(Continued)

*Primary Examiner* — Anna K Kinsaul

(57) ABSTRACT

A manufacturing method of protective pad for sportswear and the protective pad obtained by the manufacturing method are disclosed. The manufacturing method has the steps of: 1. making separate paddings using spongy materials; 2. choosing several paddings being made; adhering the several paddings with fabric pieces by heat press using a heat press mold and heat press formation devices, thereby forming the protective pad for sportswear. Specifically, the heat press mold contains cavities for accommodating the paddings; before heat press, laying a first fabric piece on the heat press mold, and then placing the paddings into the cavities; and after that laying a second fabric piece over the paddings; applying glues between the first fabric piece, the second fabric piece and the paddings; finally, adhering the first fabric piece, the second fabric piece and the paddings by heat press using the heat press formation devices.

8 Claims, 19 Drawing Sheets

(51) Int. Cl.

| | |
|---|---|
| *A41D 13/015* | (2006.01) |
| *A41D 13/05* | (2006.01) |
| *A41D 1/08* | (2018.01) |
| *A63B 71/12* | (2006.01) |
| *B29C 65/48* | (2006.01) |
| *B29C 65/00* | (2006.01) |
| *B29L 31/52* | (2006.01) |

(52) U.S. Cl.
CPC ........ *A41D 31/285* (2019.02); *A63B 71/1225* (2013.01); *B29C 65/48* (2013.01); *B29C 66/721* (2013.01); *B29C 70/46* (2013.01); *A41D 2600/10* (2013.01); *A63B 2071/125* (2013.01); *B29K 2913/00* (2013.01); *B29L 2031/52* (2013.01)

(58) Field of Classification Search
CPC .......... A63B 2071/125; A63B 71/1225; B29C 65/48; B29C 66/721; B29C 70/46; B29K 2913/00; B29L 2031/52
See application file for complete search history.

(56) References Cited

U.S. PATENT DOCUMENTS

| | | | |
|---|---|---|---|
| 2010/0205722 A1* | 8/2010 | Kim ........................ | B32B 3/10 2/455 |
| 2011/0061154 A1* | 3/2011 | Turner ............... | A41D 13/0156 2/455 |
| 2015/0201685 A1* | 7/2015 | Brohmer .............. | A41D 13/065 2/23 |

\* cited by examiner

MANUFACTURING METHOD OF A PROTECTIVE PAD FOR SPORTSWEAR AND THE PROTECTIVE PAD OBTAINED ACCORDING TO THE MANUFACTURING METHOD

BACKGROUND OF THE INVENTION

The present invention relates to a manufacturing method of sportswear and the sportswear obtained according to the manufacturing method. More specifically, the present invention relates to a manufacturing method of a protective pad for sportswear and the protective pad obtained according to the manufacturing method.

Specialized sportswear is worn during various kinds of sports activities to facilitate body movements and to prevent injuries. The function of body protection by specialized sportswear is particularly important to professional athletes. During sports activities, the body parts that are more susceptible to injuries are the parts where impacts of forces are focused on, for example, knees, ankles, shoulders, hips and crotches etc. Generally, protective pads are provided on sportswear at positions corresponding to these body parts to act as buffers so as to prevent injuries during exercises. Common protective pads provided at these positions for protective purpose are spongy bodies each formed as a one whole piece. However, since the spongy bodies are thick and such spongy bodies each formed as a one whole piece cannot freely change their shapes like soft fabrics in response to body movements, users may develop a feeling of foreign body sensation, and may not be able to move freely as they wish.

In order to solve the above problems, some protective pads with folding seams have been developed for easier bending of the protective pads. However, these modified protective pads still cannot be bent flexibly, and the manufacture thereof is also not practical enough.

BRIEF SUMMARY OF THE INVENTION

In view of the aforesaid disadvantages in the prior art, the present invention provides a manufacturing method of protective pad for sportswear. The manufacturing method disclosed by the present invention has the advantages of for example being practical and involving a low cost.

Another object of the present invention is to provide a protective pad for sportswear manufactured according to the manufacturing method disclosed herein.

The technical solutions of the present invention are disclosed as follows:

A manufacturing method of a protective pad for sportswear, comprising the following steps:

Step 1: making separate paddings using spongy materials;

Step 2: choosing several paddings being made; adhering the several paddings being chosen with fabric pieces by heat press using a heat press mold and heat press formation devices, thereby forming the protective pad for sportswear; specifically, the heat press mold contains cavities for accommodating the paddings; before heat press, laying a first fabric piece on the heat press mold, and then placing the paddings into the cavities; and after that laying a second fabric piece over the paddings; applying glues between the first fabric piece, the second fabric piece and the paddings; finally, adhering the first fabric piece, the second fabric piece and the paddings by heat press using the heat press formation devices.

Preferably, configuring peripheries of each padding into stepped portions; a method of manufacturing the paddings in said step 1 comprises the following steps: deciding a thickness of each layer of each padding; choosing the spongy materials for each layer, wherein the spongy materials chosen for each layer have a thickness corresponding to the thickness decided for the corresponding layer; cutting the spongy materials chosen for each layer into a shape that corresponds to the corresponding layer by using a laser cutting device, so that the spongy materials chosen for each layer forms a spongy piece after cutting; forming each padding by stacking up spongy pieces of all the layers of each padding.

In the above preferred implementation of the present invention, the reason for using a padding having stepped portions is that, when using the padding, the spongy piece of the padding having a smaller surface area will come into contact with the user's body, and external impact forces will be transferred to the body via the padding, which then buffers impact forces and consumes the energy being imparted thereon through compression and deformation of the spongy materials used for making the padding; since the spongy piece of the padding distanced away from the body has a larger surface area, that spongy piece will consume the largest amount of energy imparted by the impact forces, and since the spongy piece that comes into contact with the body has a smaller surface area, the energy consumed is the least; by using such stepped structure comprising layers of spongy pieces having decreasing surface areas, the energy consumed is reduced stepwise so that the final impact forces imparted to the body make up a small load of forces, thereby achieving the goal of further reduction of impact forces. The formation of the padding by stacking up layers of spongy pieces is an easy way of formation. Spongy pieces can also be directly obtained by cutting using a laser cutting device so as to obtain precise shapes. Also, layers of spongy pieces can be adhered together during a final adhering procedure, thereby simplifying the procedure as the spongy pieces are not being required to be adhered in advance.

Preferably, adhering layers of cut spongy pieces in said step 2; specifically, a process of laying materials in said step 2 comprises the following steps: laying a first fabric piece; placing the spongy pieces forming the layers of the paddings, wherein in each padding, spongy pieces are placed according to a sequence based on their surface areas from small to large; laying a second fabric piece over the paddings. As such, the layers of spongy pieces can be adhered during a final adhering procedure, thereby simplifying the procedure as the spongy pieces are not being required to be adhered in advance.

Preferably, a method of laying layers of spongy pieces comprise the following steps: forming positioning boards wherein each positioning board is formed by cutting out positional through openings from a flat board by using a laser cutting device, wherein the positional through openings of each positioning board correspond to the positional arrangement of the paddings of the protective pad and also correspond to shapes and sizes of the spongy pieces which belong to respective same layers among the paddings; each positioning board is made for the spongy pieces which belong to respective same layers among the paddings; before placing first layers of the spongy pieces of the paddings, laying a first positioning board on the heat press mold; positioning boards are positioned with respect to the heat press mold in accordance with predetermined positioning references; placing the first layers of spongy pieces of the paddings into the positional through openings of the first positioning board; after placing the first layers of spongy pieces, taking away the first positioning board and then laying a second positioning board on the heat press mold; placing second layers of spongy pieces of the paddings; taking away the second positioning board, laying a third positioning board on the heat press mold and then placing third layers of spongy pieces if required; repeating such procedures of taking away a previous positioning board, laying a subsequent positioning board on the heat press mold and then placing subsequent layers of spongy pieces until all layers of spongy pieces are being placed.

In the above preferred implementation of the present invention, the use of positioning boards for assistance in laying the spongy pieces significantly enhances the efficiency and the accuracy of positioning. The positioning boards are also very convenient to use, easy to be made and having precise shapes. The positioning boards can be precisely cut out by directly inputting design parameters of the paddings to the laser cutting device. Each positioning board can be made by a flat board such as a paper board, a thin plastic board and a thin board template etc. Preferably, each positioning board is made by a paper board. A paper board has the advantages of convenient supply of raw materials for manufacture, low manufacturing costs and easy cutting by using a laser cutting device etc. The predetermined positioning references of positioning the positioning board with respect to the heat press mold may be various. In general, each positioning board and the heat press mold are mutually positioned by aligning their peripheral corners; alternatively, the positioning may be achieved by configuring positioning columns on the heat press mold and corresponding positioning holes on the positioning board.

According to a preferred manufacturing method of a protective pad for sportswear, peripheries of each of the paddings are configured as stepped portions; making of the paddings in said step 1 comprises the following steps: firstly, cutting out spongy blanks each having a shape corresponding to the largest cross sectional area of a corresponding padding intended to be made; subjecting the spongy blanks to formation by heat press by using a formation mold and heat press formation devices, wherein plurality of cavities for forming the paddings are provided on the formation mold; shapes of the cavities match with shapes of the paddings each having stepped portions; each cavity corresponds to one kind of padding; during formation by heat pressing, the spongy blanks are placed into the cavities, and then the heat press formation devices are activated to form the spongy blanks by heat press so as to obtain the paddings each having stepped portions.

The above preferred method has the advantage of forming the paddings via a single step. Compared with making the paddings formed by layers of spongy pieces, the above preferred method saves the steps of cutting out and adhering the spongy pieces. However, the above preferred method has the disadvantage of requiring a set of formation mold.

Preferably, the formation mold is formed by plurality of mold units; each mold unit contains one cavity. As such, mold units having different shapes of cavities can be chosen and combined to form the formation mold based on practical needs. Mold units are provided because paddings used in different protective pads may have different shapes, quantities, and positional arrangements; if the cavities of the formation mold cannot be changed, each formation mold can only make a fixed set of paddings. However, by providing mold units which can be flexibly chosen according to practical needs, practicability of manufacturing is further enhanced.

Preferably, in said step 2, before laying a first fabric piece, laying a press layer, wherein through openings that match with the shapes of the paddings are provided on the press layer, and peripheries of the through openings align with peripheries of the cavities.

A protective pad for sportswear obtained according to the above manufacturing method of protective pad for sportswear is formed by plurality of separate paddings arranged according to a predetermined positional arrangement and adhered to fabric pieces, wherein the fabric pieces comprise a first fabric piece and a second fabric piece; the paddings are positioned between the first fabric piece and the second fabric piece.

Preferably, peripheries of each padding are formed as stepped portions. The beneficial effects of stepped portions are described in the above disclosure concerning the manufacturing method of such protective pad.

Preferably, a press layer is provided on the first fabric piece; the press layer spreads over the areas between the paddings; peripheries of through openings provided on the press layer align with peripheries of the paddings. On one hand, the press layer makes the outer shapes of the paddings more delineable in a way that the connecting portions between the paddings and the first fabric piece form delineable edges such that the buffering effects of the paddings can be sufficiently achieved. On the other hand, the press layer can strengthen the connecting strength of the entire protective pad and enhance the aesthetic appearance of the protective pad.

Preferably, plurality of ventilation pores are provided on the protective pad to provide ventilation, disperse heat and to enhance the degree of comfort during use.

Preferably, peripheral shapes of the first fabric piece and the second fabric piece match with a shape of the sportswear where the protective pad is applied on. As such, the protective pad can be more smoothly attached to the body part of the user intended for protection so as to enhance the degree of comfort and the protection effect.

Preferably, the protective pad is formed by layers of spongy pieces adhered together. The beneficial effects of the layers of spongy pieces are described in the above disclosure concerning the manufacturing method of such protective pad.

Preferably, the protective pad is formed by a single piece of spongy blank which forms the protective pad via heat press. The beneficial effects of the use of a single piece of spongy blank are described in the above disclosure concerning the manufacturing method of such protective pad.

The present invention has the following advantages compared with the prior art:

1. Since separate paddings are first manufactured, and are selected for use in accordance with practical needs to form a protective pad according to a predetermined positional arrangement, the most suitable paddings can be chosen and being arranged to form a protective pad in the most reasonable manner in accordance with different body parts, different target users, and different occasions where the protective pad will be used. In other words, a specific protective pad for a specific body part can be made. Therefore, the protective pad being made does not only provide the greatest protective effects and the greatest degree of comfort, but also the making thereof is significantly more flexible and practical wherein the protective pad most suitable for the client can be made according to the requirements specialized by the client.

2. Since the paddings of a protective pad are mutually connected via fabric pieces, and fabric pieces are known to be soft, bending can be easily achieved at the areas between the paddings. As such, the protective pad can flexibly change its shape in response to the body movement of the body part on which the protective pad is applied. Thus, the protective pad can smoothly attach to the body part to provide the greatest protection of the body part of the user.

BRIEF DESCRIPTION OF THE DRAWINGS

FIG. 1 to FIG. 8 illustrate the structural diagrams of the present invention according to the first embodiment, wherein:

FIG. 1 is a structural view of a protective pad for sportswear obtained according to a manufacturing method of the protective pad disclosed in the first embodiment of the present invention;

FIG. 2 is an enlarged cross sectional view along line A-A of FIG. 1;

FIG. 3 is a structural view of a padding according to the first embodiment;

FIG. 4 is a structural view of the press layer according to the first embodiment;

FIG. 5 is a structural view of the heat press mold according to the first embodiment;

FIG. 6 illustrates the order of laying materials when using the heat press mold to manufacture the protective pad according to the first embodiment;

FIG. 7 is a structural view of the first positioning board according to the first embodiment;

FIG. 8 is a structural view of the second positioning board according to the first embodiment;

FIG. 9 to FIG. 20 illustrate the structural diagrams of the present invention according to the second embodiment, wherein:

FIG. 9 is a structural view of the spongy blank according to the second embodiment;

FIG. 10 is a structural view of a first kind of formation mold according to the second embodiment;

FIG. 11 is a structural view of a second kind of formation mold according to the second embodiment;

FIG. 12 shows six paddings made by the formation mold of either the kind shown in FIG. 10 or FIG. 11;

FIG. 13 is a structural view of the heat press mold according to the second embodiment;

FIG. 14 is a structural view of a first kind of protective pad for sportswear obtained according to the manufacturing method of the second embodiment;

FIG. 15 is an enlarged sectional view along line B-B of FIG. 14;

FIG. 16 is a structural view of a second kind of protective pad for sportswear obtained according to the manufacturing method of the second embodiment;

FIG. 17 is a structural view of a third kind of formation mold according to the second embodiment;

FIG. 18 is a structural view of a first kind of protective pad formed by combining two or more paddings made by the formation mold shown in FIG. 17.

FIG. 19 is a structural view of a second kind of protective pad formed by combining two or more paddings made by the formation mold shown in FIG. 17.

FIG. 20 is a structural view of a third kind of protective pad formed by combining two or more paddings made by the formation mold shown in FIG. 17.

DETAILED DESCRIPTION OF THE INVENTION

The present invention is described further in detail below with reference to the drawings and embodiments. However, it is understood that the implementation of the present invention should not be limited to the present detailed description.

Embodiment 1

With reference to FIGS. 1-8, a manufacturing method of a protective pad for sportswear comprises the following steps:

Step 1: making separate paddings 2 using spongy materials; configuring peripheries of each padding 2 into stepped portions; in the present embodiment, each padding 2 has two layers; a method of manufacturing each padding comprises the following steps:

Deciding a thickness of each layer of each padding 2; choosing the spongy materials for each layer, wherein the spongy materials chosen for each layer have a thickness corresponding to the thickness decided for the corresponding layer; cutting the spongy materials chosen for each layer into a shape that corresponds to the corresponding layer by using a laser cutting device, so that the spongy materials chosen for each layer forms a spongy piece 2-1 after cutting; forming each padding 2 (see FIG. 3) by stacking up spongy pieces of all the layers of each padding; adhesion between the sponge pieces is achieved through step 2 as detailed below.

Step 2: choosing several paddings 2; adhering the several paddings 2 being chosen with fabric pieces by heat press using a heat press mold 1 and heat press formation devices, thereby forming the protective pad for sportswear. The heat press mold 1 contains cavities 1-1 having shapes (a stepped shape having a narrower bottom and a wider top) that match with the paddings 2 being chosen. Positional arrangement of the cavities 1-1 matches with positional arrangement of the paddings 2 of the protective pad subsequently manufactured.

Figure 6:
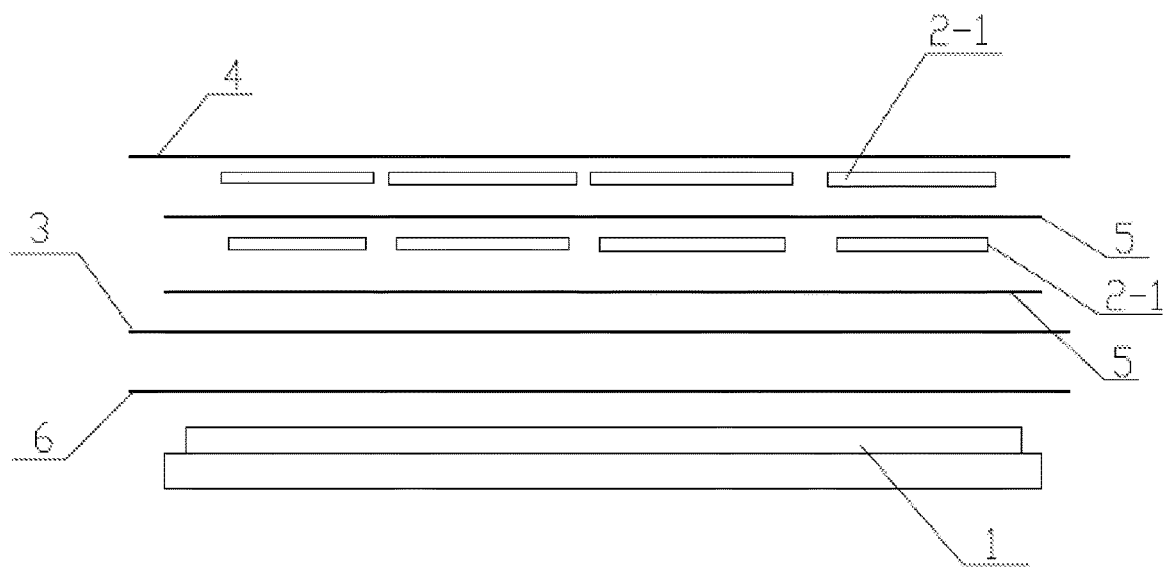
Figure 7:
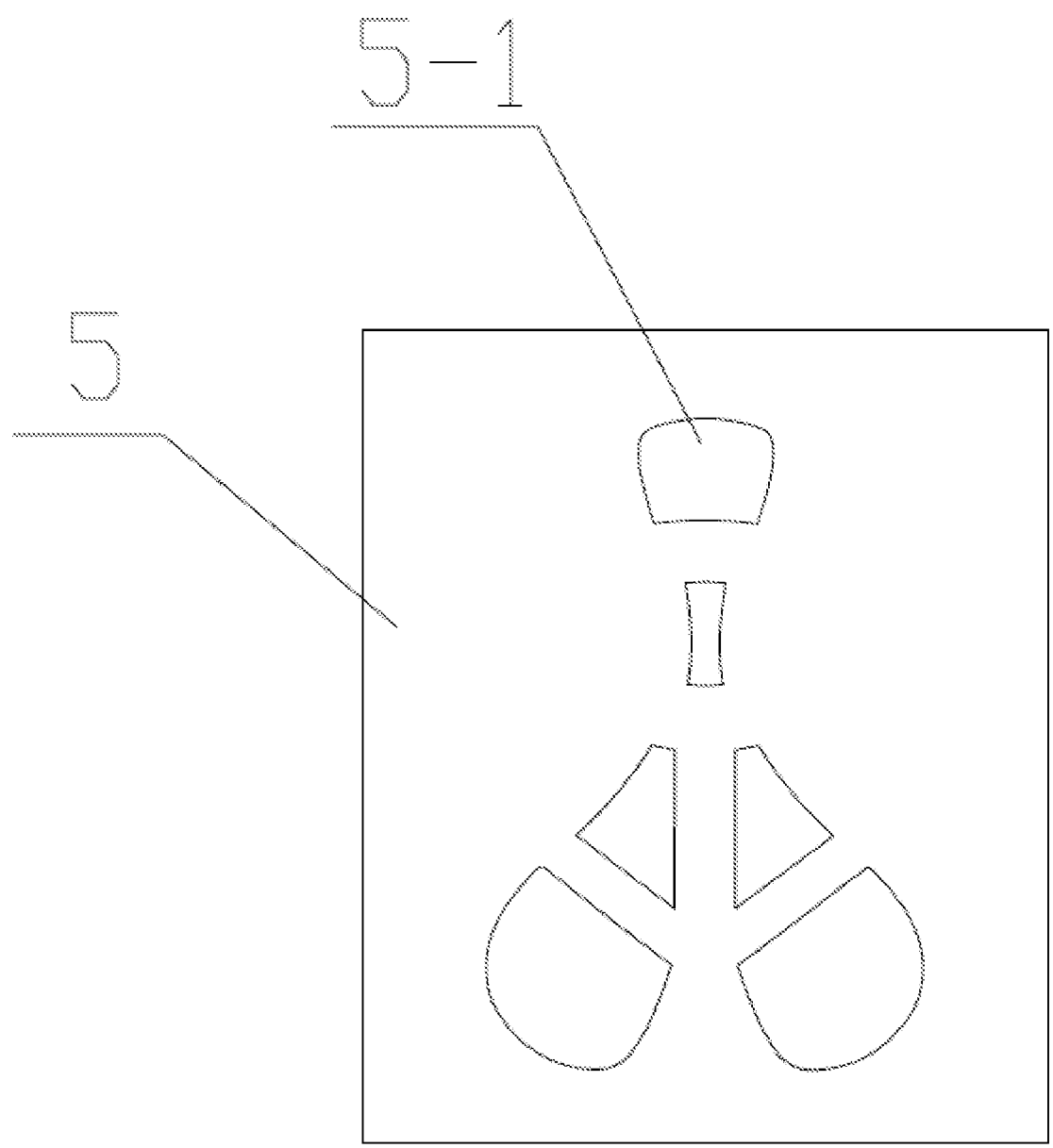
Figure 8:
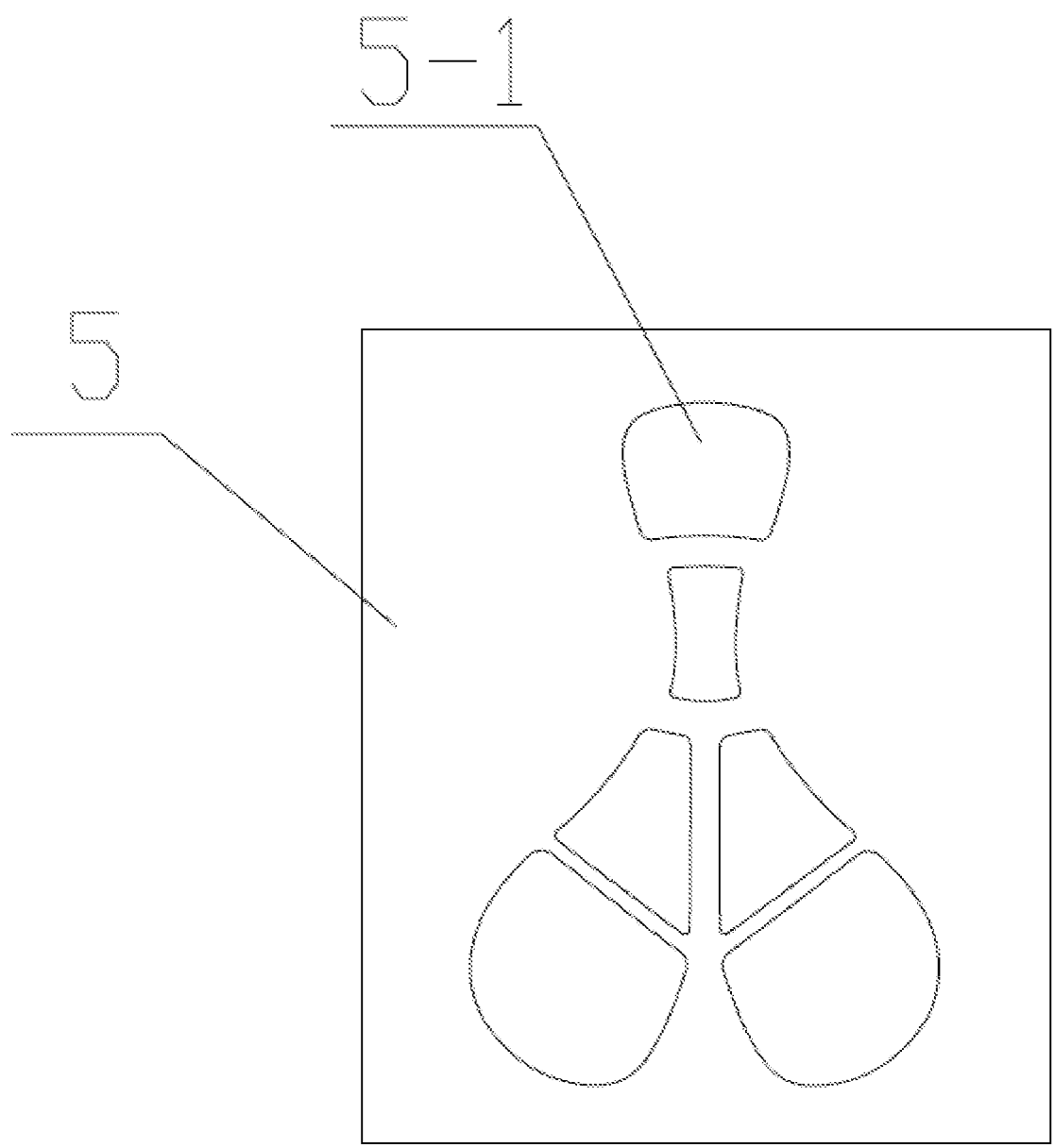
Figure 9:
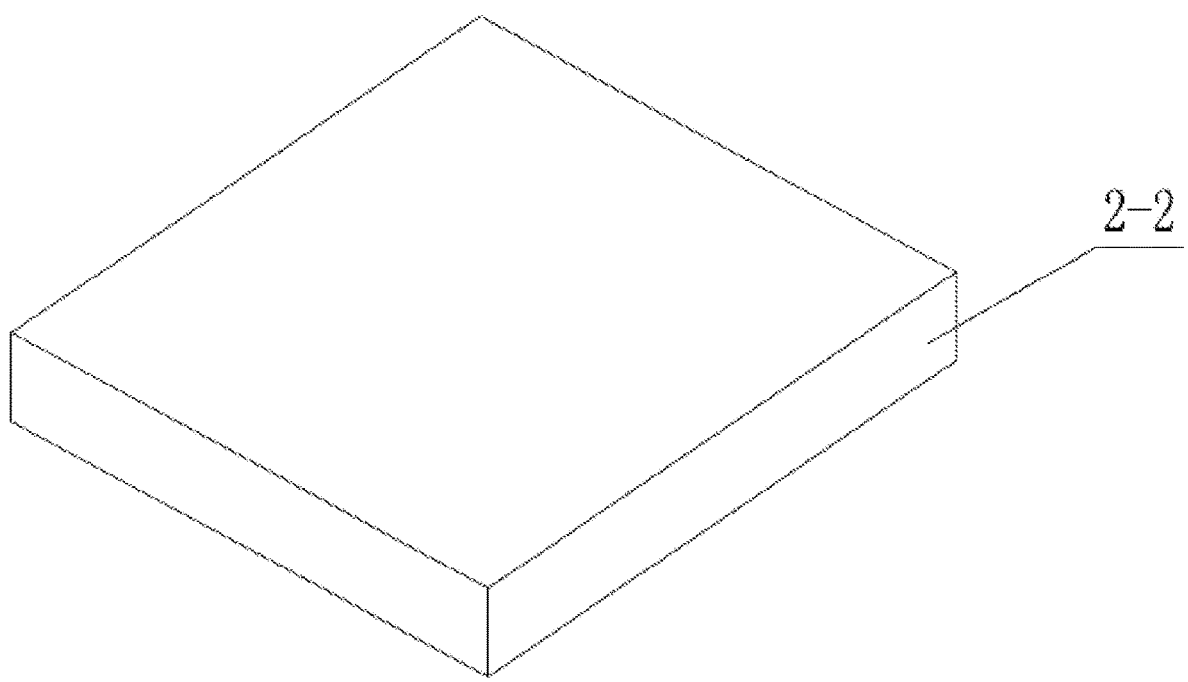

With reference to FIG. 6, during manufacture of the protective pad by using the heat press mold 1 and the heat press formation devices, materials are laid on the heat press mold 1 according to the following sequence: firstly, laying a press layer on the heat press mold 1, wherein peripheries of through openings distributed on the press layer 6 align with upper peripheries of the cavities 1-1; secondly, laying a first fabric piece 3 on the heat press mold 1; thirdly, placing the paddings 2 into the cavities 1-1; fourthly, laying a second fabric piece 4 over the paddings 2, and glues are applied between the press layer 6, the first and second fabric pieces and the paddings 2; fifthly, adhering the press layer 6, the first and second fabric pieces and the paddings 2 via heat press by using the heat press formation devices.

With reference to FIG. 6, in the step of placing the paddings 2 into the cavities 1-1, spongy pieces 2-1 forming the layers of the paddings are placed into the cavities 1-1, wherein in each padding, spongy pieces 2-1 are placed into a respective cavity according to a sequence based on their surface areas from small to large. A method of placing the paddings into the cavities 1-1 comprises the following steps: preparing positioning boards 5 (see FIGS. 7 and 8), wherein positioning boards 5 are each formed by cutting out positional through openings 5-1 from a flat board by using a laser cutting device, wherein the positional through openings 5-1 of each positioning board correspond to the positional arrangement of the paddings of the protective pad and also correspond to shapes and sizes of the spongy pieces which belong to respective same layers among the paddings; each positioning board is made for the spongy pieces which belong to respective same layers among the paddings; next, before placing first layers of the spongy pieces of the paddings, laying a first positioning board on the heat press mold 1; the positioning boards are positioned with respect to the heat press mold 1 in accordance with predetermined positioning references; after that, placing the first layers of spongy pieces of the paddings into the positional through openings of the first positioning board; after placing the first layers of spongy pieces, taking away the first positioning board and then laying a second positioning board on the heat press mold 1; placing second layers of spongy pieces of the paddings. The predetermined positioning references of positioning the positioning board with respect to the heat press mold 1 may be various. In general, each positioning board and the heat press mold 1 are mutually positioned by aligning their peripheral corners (if the heat press mold 1 is made in a rectangular shape, each positioning board 5 is also made in a rectangular shape of the same size, and the peripheral corners of the heat press mold 1 and the peripheral corners of the positioning board 5 align with one another when the heat press mold and the positioning board are mutually positioned). Further, each positioning board can be made by a flat board such as a paper board, a thin plastic board and a thin board template etc. Preferably, each positioning board is made by a paper board. A paper board has the advantages of convenient supply of raw materials for manufacture, low manufacturing costs and easy cutting by using a laser cutting device etc.

Figure 1:
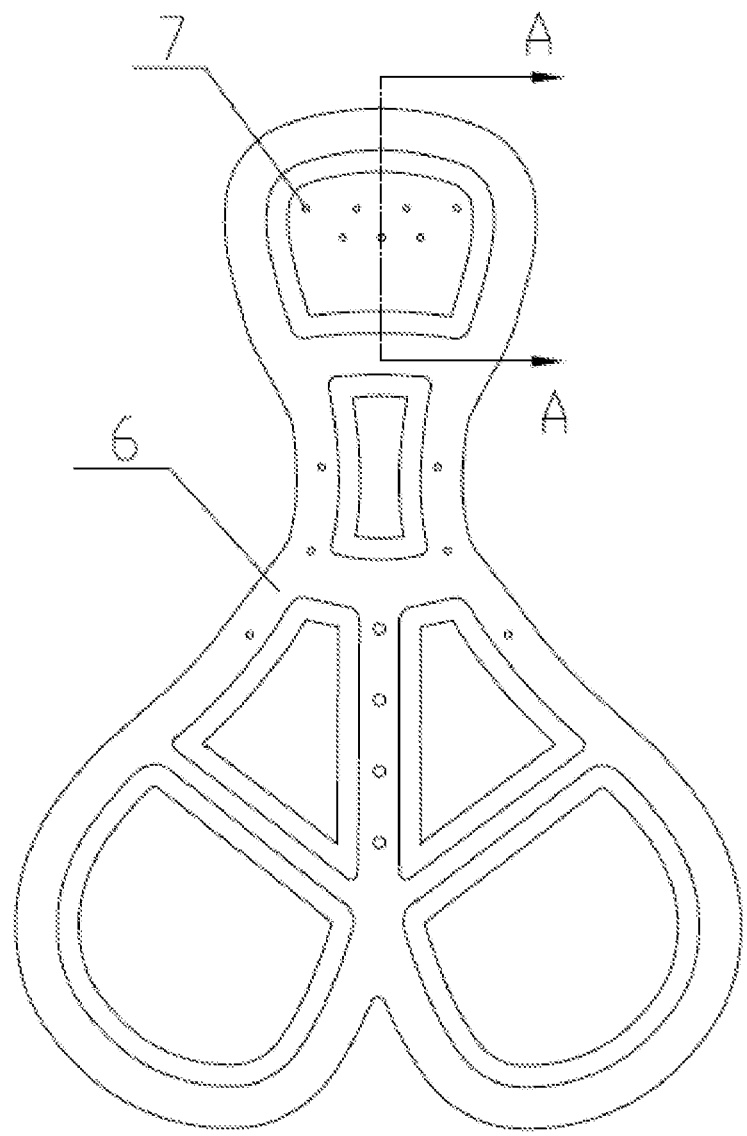
Figure 2:
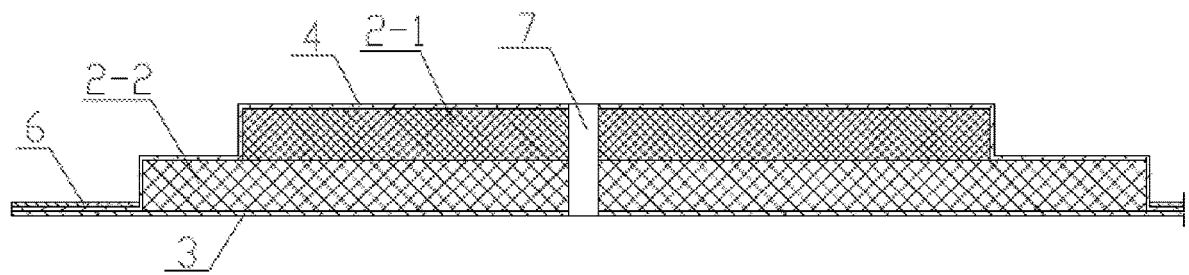
Figure 3:
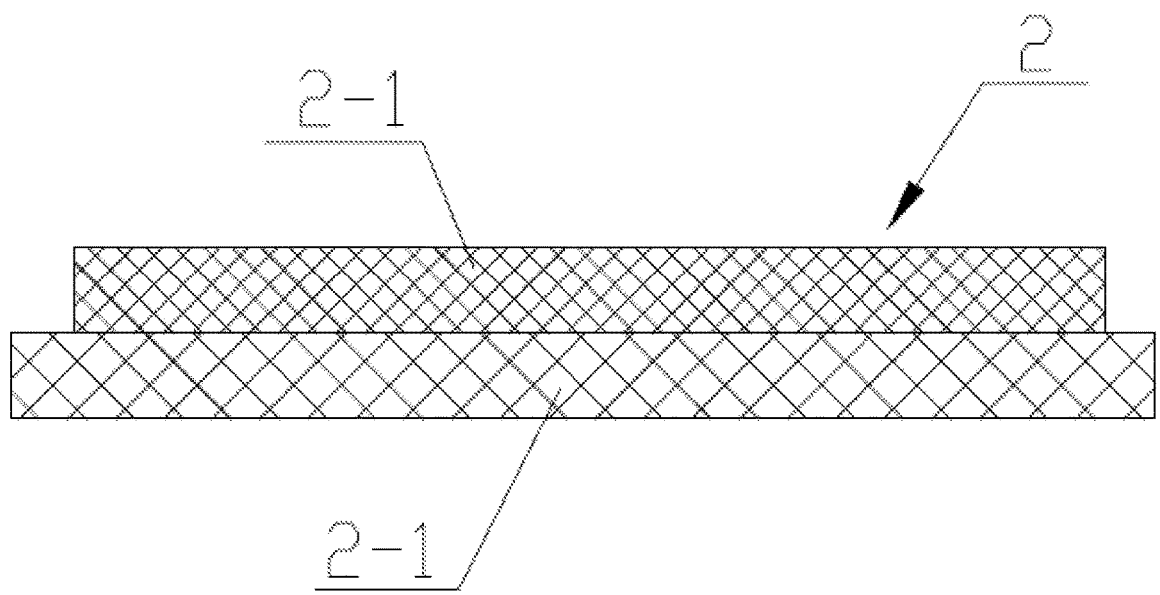
Figure 4:
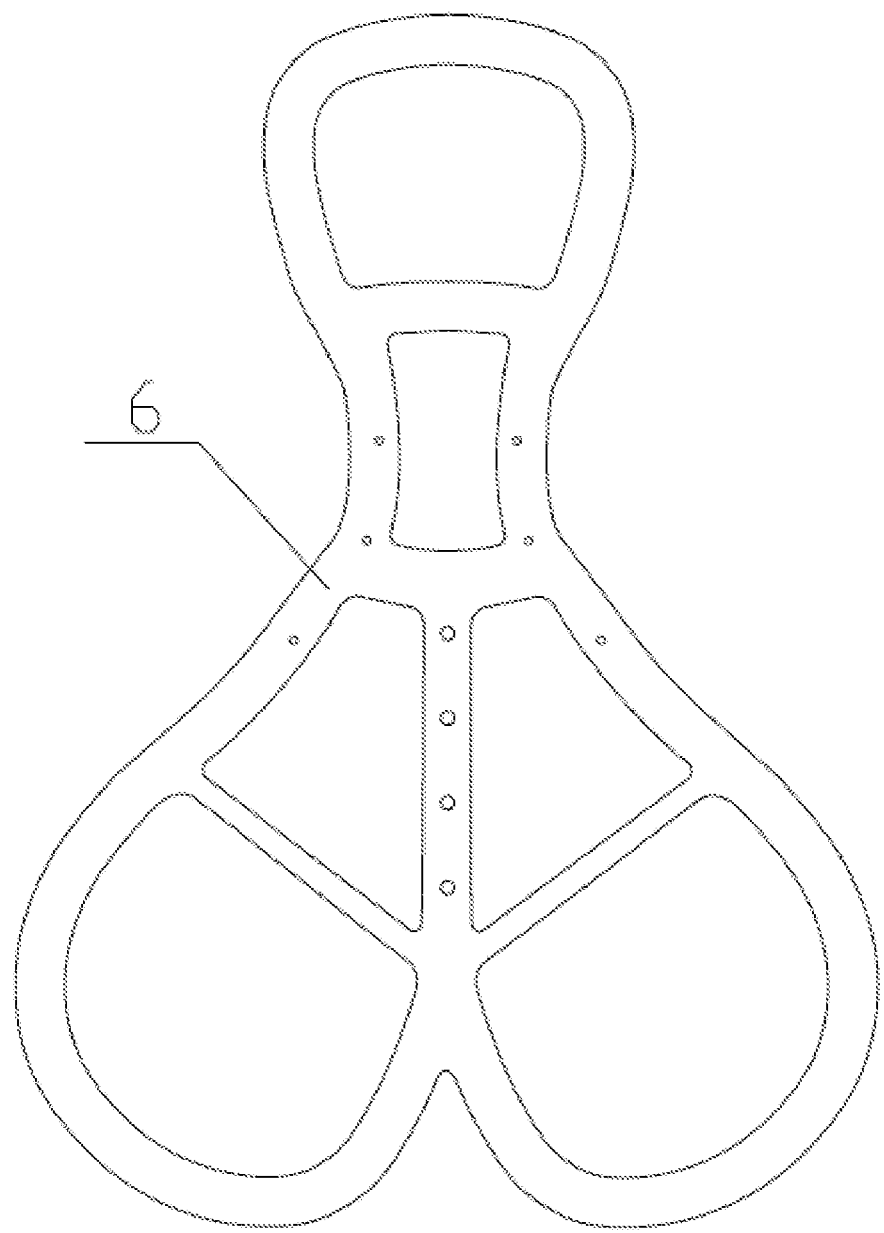
Figure 5:
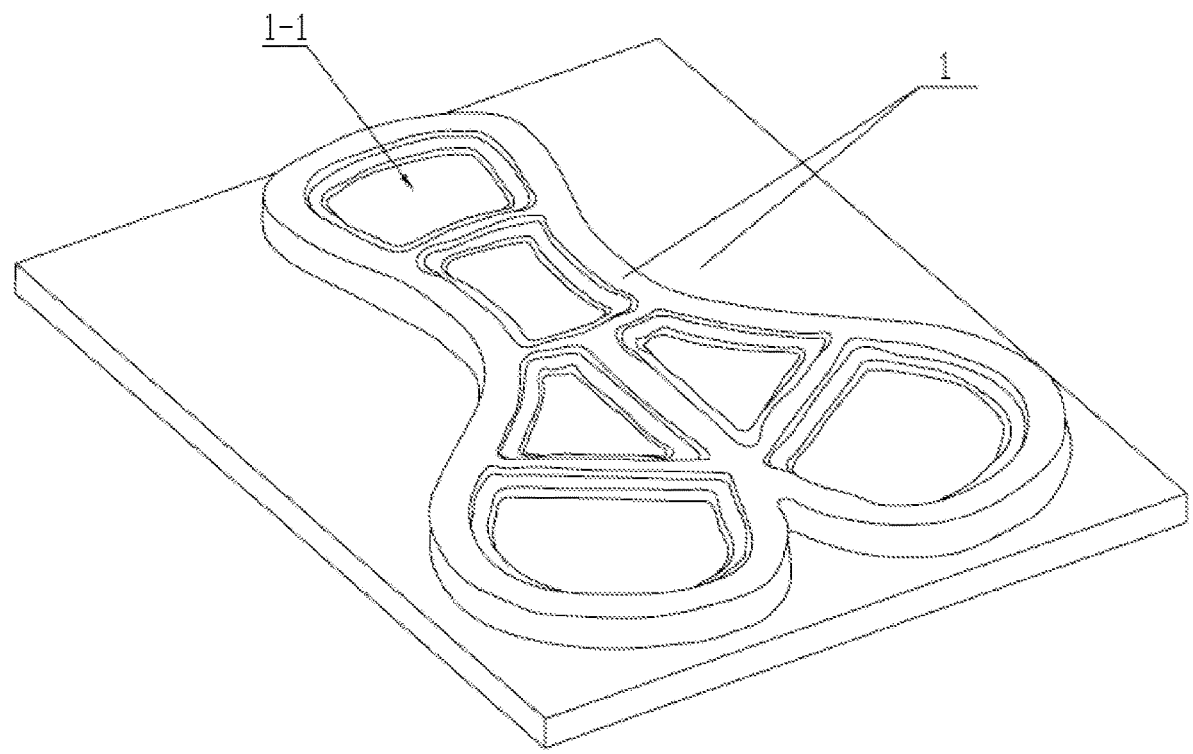

With reference to FIG. 1 and FIG. 6, during actual manufacture after the first fabric piece 3, the second fabric piece 4 and the press layer 6 are adhered, an outer shape of the protective pad has still not been formed; outer peripheries of a protective pad usually form a shape that matches with a shape of the sportswear where the protective pad is applied. Therefore, after adhering procedure by heat pressing, the protective pad has to obtain an outer shape by cutting via a laser cutting device in order to produce a final product. The final product can be sewn at a specific area of an intact piece of sportswear, or it can be sewn and engaged at a cavity pre-formed on the sportswear to become a constituent part of the specific area of the sportswear. Further, plurality of ventilation pores 7 are provided on the protective pad for ventilation and heat dispersion. The ventilation pores 7 are formed when forming the outer shape of the protective pad by cutting.

With reference to FIGS. 1-4, the protective pad for sportswear obtained according to the above manufacturing method of protective pad for sportswear is formed by plurality of separate paddings 2 arranged in a predetermined positional arrangement and adhered to fabric pieces, wherein the fabric pieces comprise a first fabric piece 3 and a second fabric piece 4; the paddings are positioned between the first fabric piece 3 and the second fabric piece 4. Peripheries of each padding are formed as stepped portions; each padding is formed by adhering layers of spongy pieces 2-1; the spongy pieces of different layers of each padding have different surface areas so as to form the stepped portions at the peripheries of each padding. Peripheries of a layer of spongy piece and peripheries of another adjacent layer of spongy piece are distanced evenly. In the present embodiment, each padding has two layers, in other words, each padding is formed by adhering two spongy pieces.

With reference to FIGS. 1-4, a press layer 6 is provided on the first fabric piece 3; the press layer 6 spreads over the areas between the paddings 2; outer peripheries of the press layer 6 align with outer peripheries of the protective pad; through openings that match with the paddings 2 are provided on the press layer 6; peripheries of the through openings align with peripheries of the paddings 2. On one hand, the press layer 6 makes the outer shapes of the paddings more delineable in a way that the connecting portions between the paddings 2 and the first fabric piece 3 form delineable edges such that the buffering effects of the paddings can be sufficiently achieved. On the other hand, the press layer 6 can strengthen the connecting strength of the entire protective pad and enhance the aesthetic appearance of the protective pad. The press layer 6 is also made via laser cutting. Specifically, the press layer 6 is formed by cutting out through openings that match with the paddings 2 from a piece of fabric. During processing, design parameters of the paddings 2 are entered into a laser cutting device in order to cut out the through openings that match with the paddings 2. Plurality of ventilation pores 7 are provided on the protective pad to provide ventilation, disperse heat and to enhance the degree of comfort during use. The ventilation pores 7 are also formed by laser cutting.

With reference to FIGS. 1-4, peripheral shapes of the first fabric piece 3, the second fabric piece 4 and the press layer 6 match with a shape of the sportswear where the protective pad is applied on. As such, the protective pad can be more smoothly attached to the body part of the user intended for protection so as to enhance the degree of comfort and the protection effect. FIG. 1 shows the protective pad applied to the crotch of sport trousers.

Embodiment 2

Figure 11:
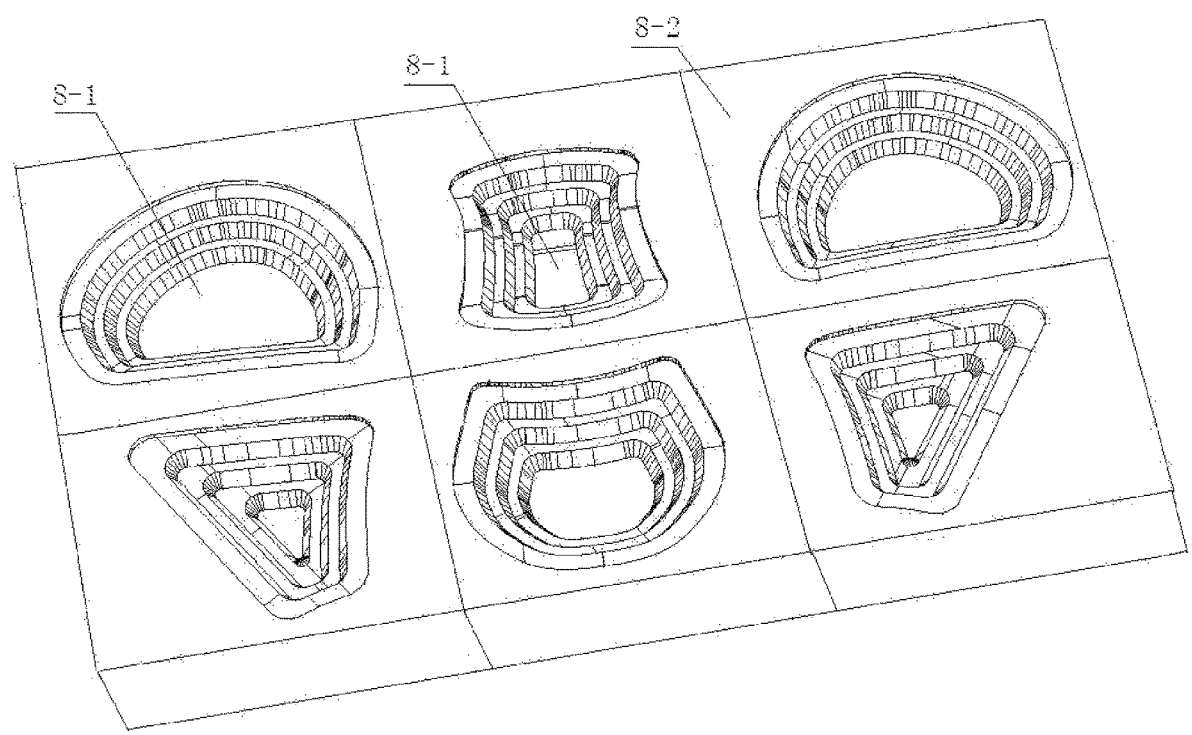
Figure 12:
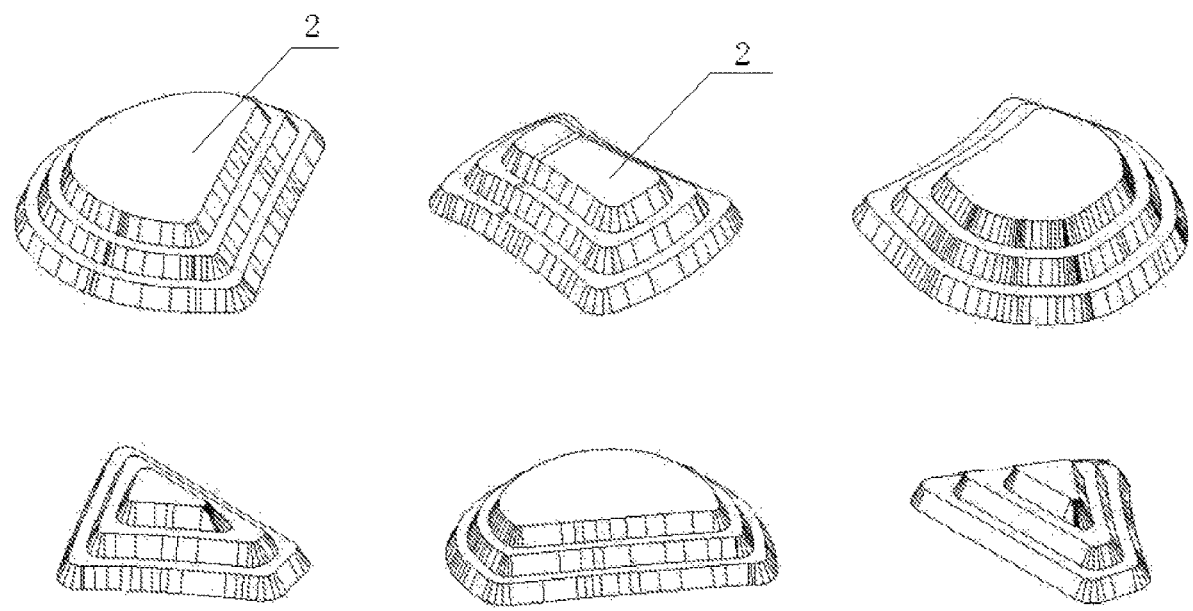

With reference to FIGS. 9-15, a manufacturing method of a protective pad for sportswear according to embodiment 2 has the following differences compared with embodiment 1:

Making of the paddings 2 in said step 1 according to this embodiment comprises the following steps: firstly, cutting out spongy blanks 2-2 (see FIG. 9) each having a shape corresponding to the largest cross sectional area of a corresponding padding intended to be made; subjecting the spongy blanks 2-2 to formation by heat press by using a formation mold 8 and heat press formation devices, wherein plurality of cavities 8-1 for forming the paddings 2 are provided on the formation mold 8; shapes of the cavities 8-1 match with shapes of the paddings each having stepped portions; each cavity corresponds to one kind of padding (see FIG. 10 and FIG. 11); during formation by heat pressing, the spongy blanks 2-2 are placed into the cavities 8-1, and then the heat press formation devices are activated to form the spongy blanks 2-2 by heat press so as to obtain the paddings 2 each having stepped portions (see FIG. 12).

Figure 10:
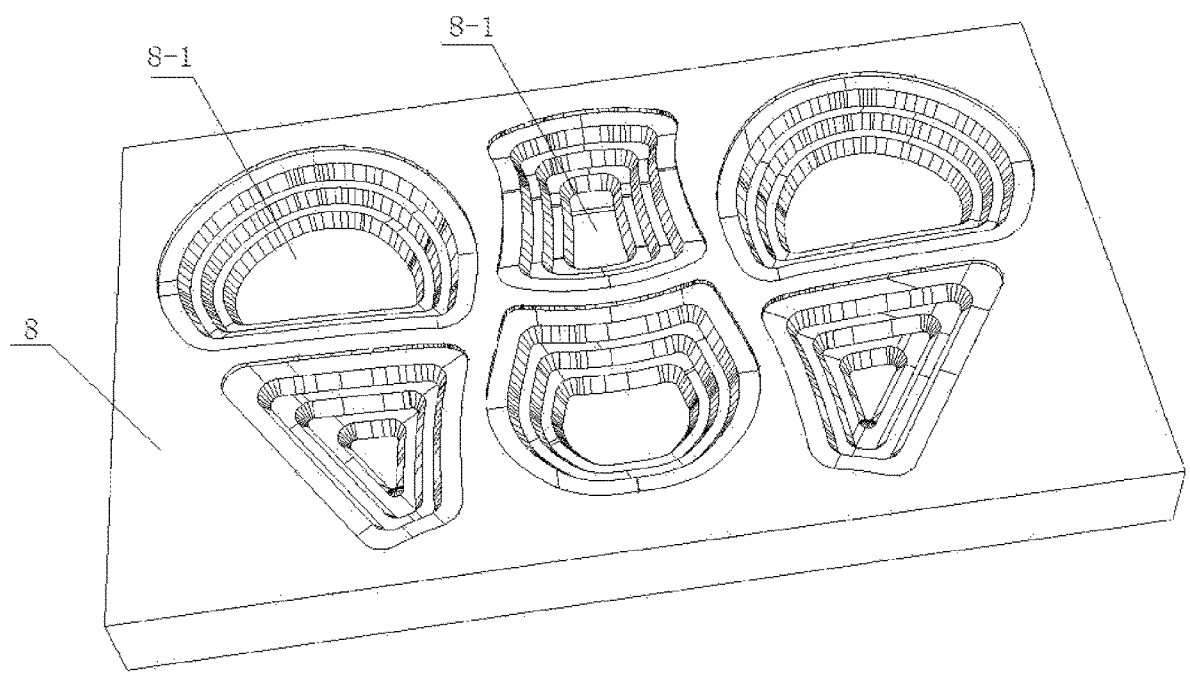

With reference to FIG. 10, the cavities 8-1 of the formation mold 8 can be provided on the same base board. As such, the formation mold 8 is limited to make paddings 2 having the specific shapes defined by the cavities on the formation mold. With reference to FIG. 11, the formation mold can also be formed by plurality of mold units 8-2; each mold unit contains one cavity. As such, mold units 8-2 having different shapes of cavities 8-1 can be chosen and combined to form the formation mold 8 based on practical needs. Mold units are provided because paddings 2 used in different protective pads may have different shapes, quantities, and positional arrangements; if the cavities 8-1 of the formation mold 8 cannot be changed, each formation mold 8 can only make a fixed set of paddings. However, by providing mold units 8-2 which can be flexibly chosen according to practical needs, practicability of manufacturing is further enhanced. Outer shapes and sizes of the mold units 8-2 should be the same. Generally, each mold unit has a cuboid shape to facilitate the combination and alignment of the mold units; mold units 8-2 can be mutually connected with one another using screw bolts.

Figure 13:
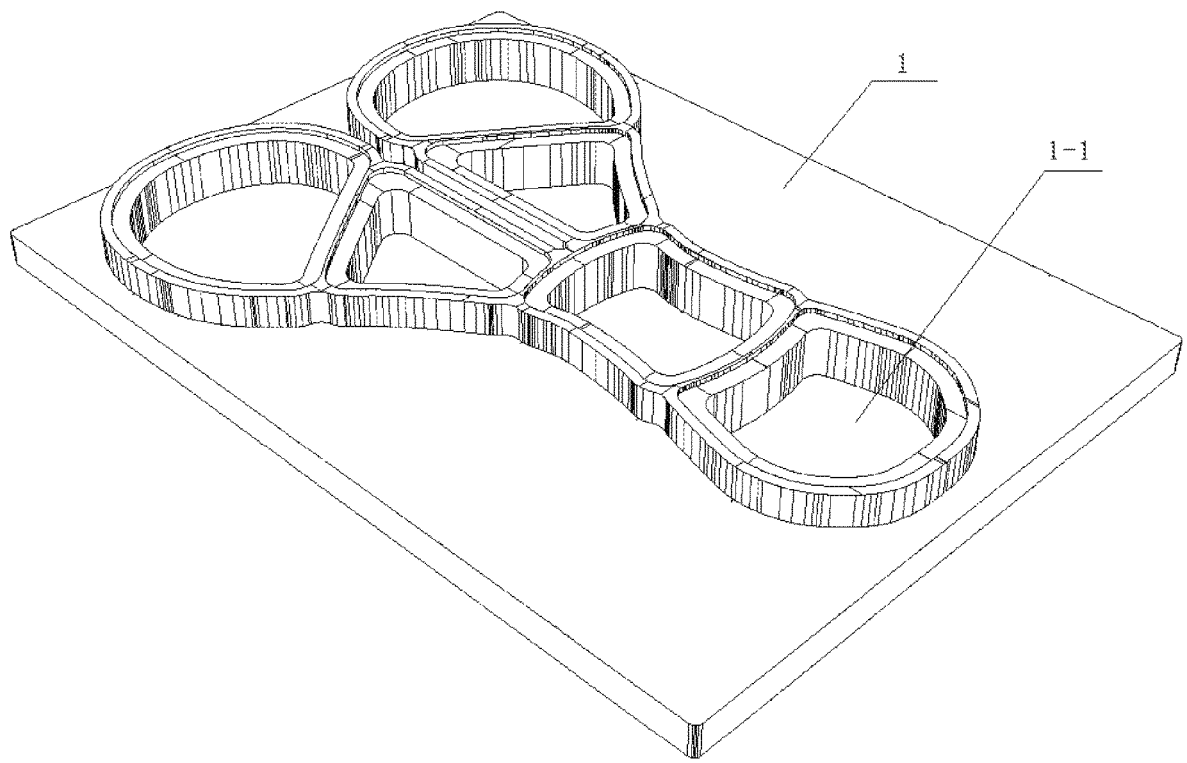

With reference to FIG. 13, the cavities 1-1 of the heat press mold 1 are not required to be configured to have stepped shapes as in said step 2. In the present embodiment, a shape of each cavity 1-1 equals a shape of the largest cross sectional area of a corresponding padding. In the step of laying various layers of materials, firstly, laying the press layer 6, and then the first fabric piece 3, and next placing the paddings into the cavities and finally laying the second fabric piece 4 over the paddings, thereby saving the steps of placing layers of spongy pieces according to embodiment 1.

Figure 14:
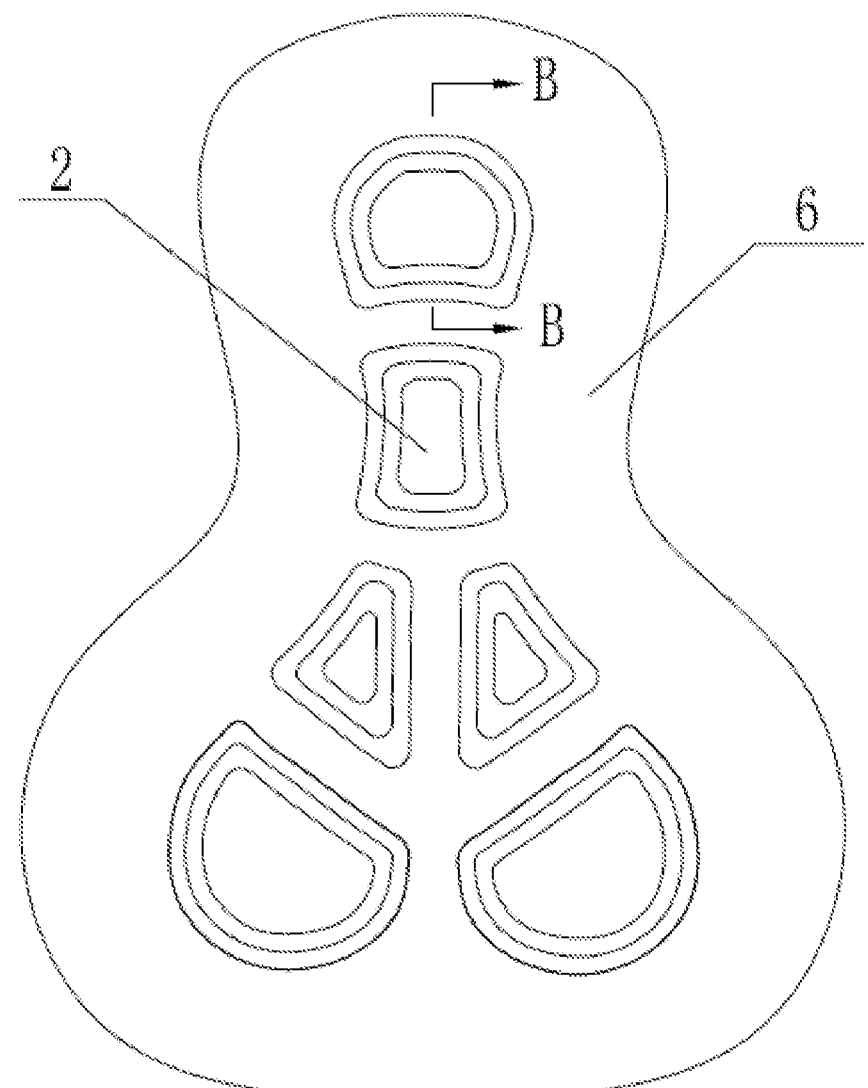
Figure 15:
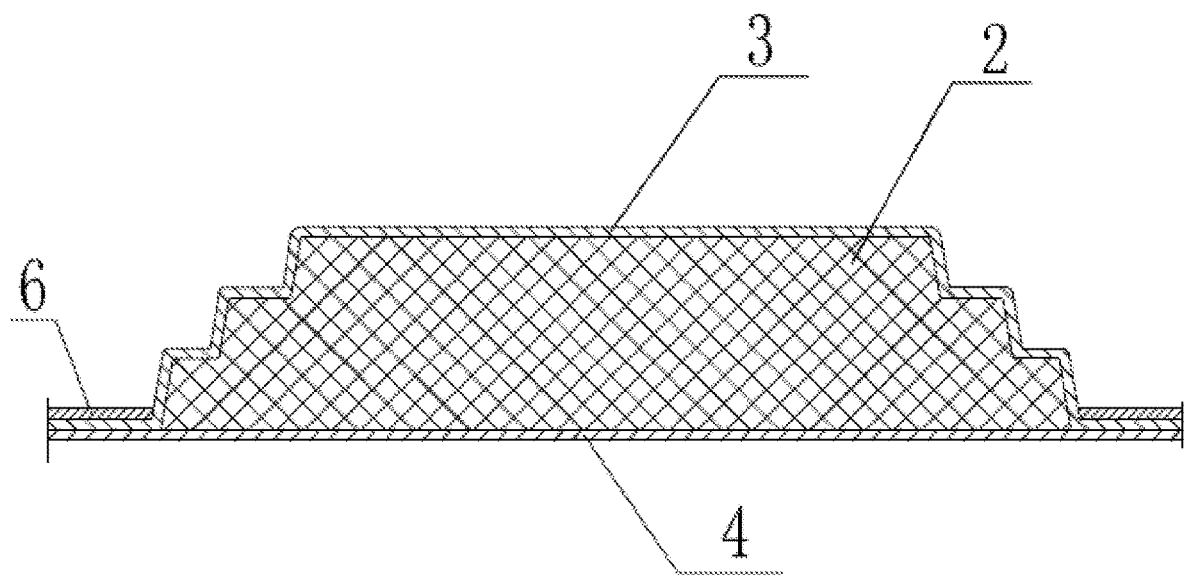
Figure 16:
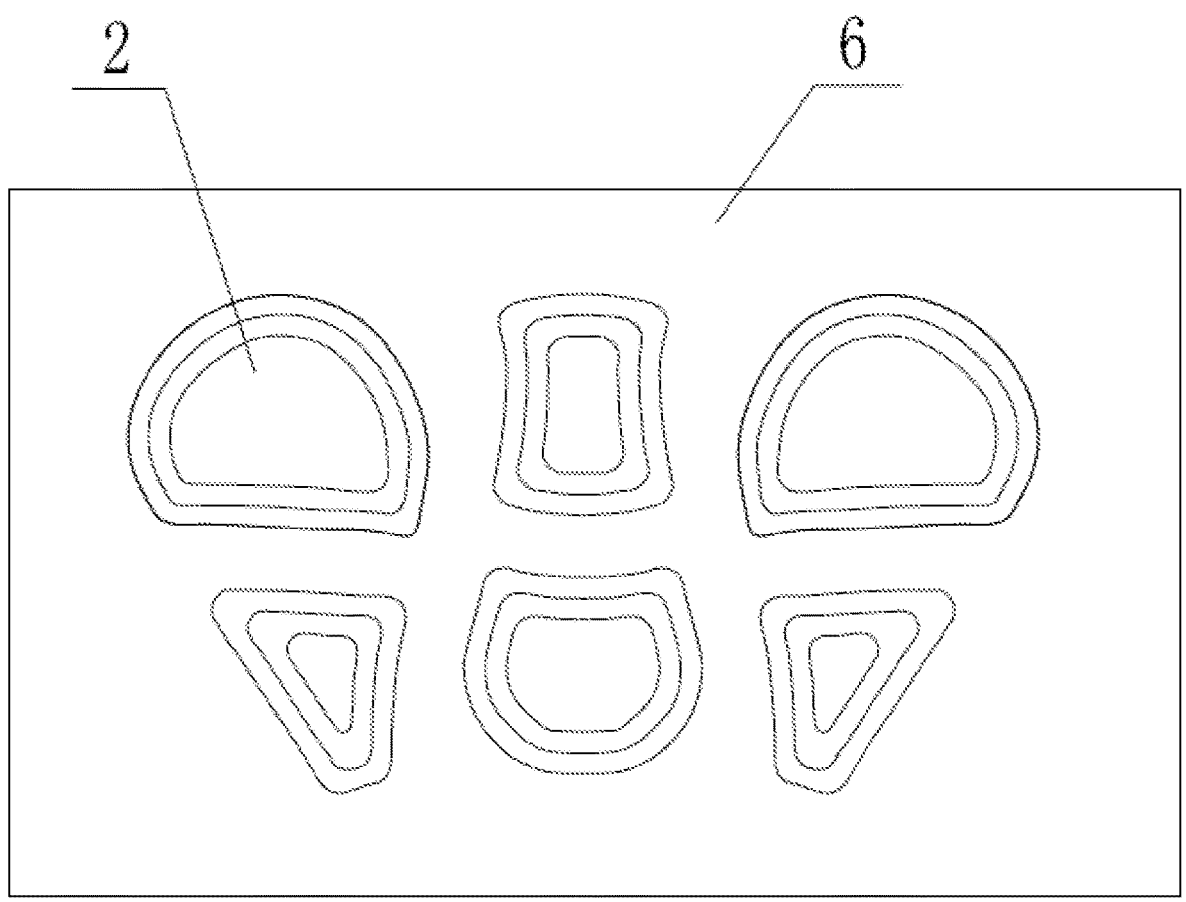

According to the present invention, the different paddings 2 can be chosen to form the protective pad in accordance with different requirements for use. For example, the paddings 2 made by the formation mold 8 of according to either FIG. 10 or FIG. 11 not only can form the protective pad as shown in FIG. 14, but also can form the protective pad as shown in FIG. 16.

Figure 17:
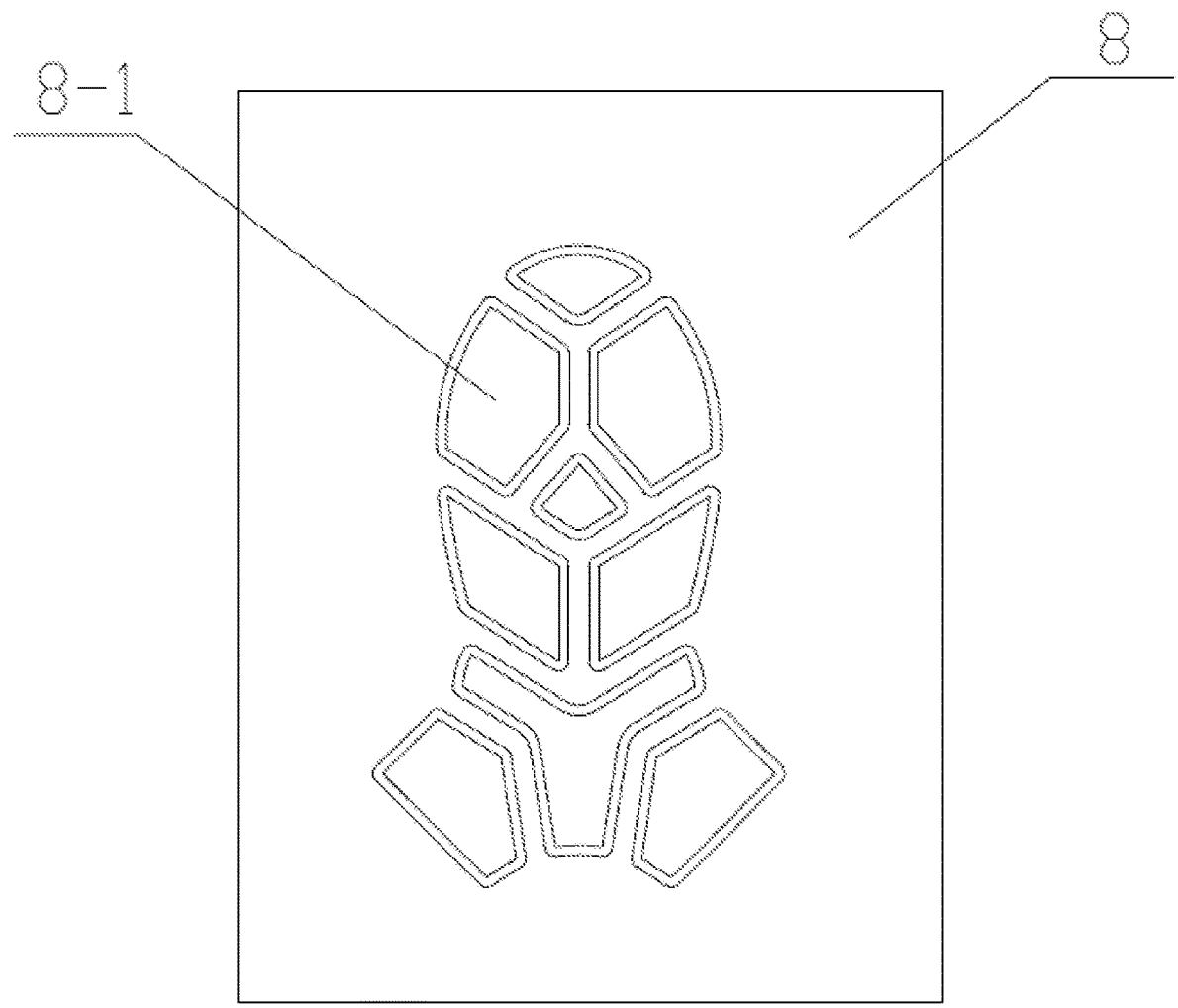
Figure 18:
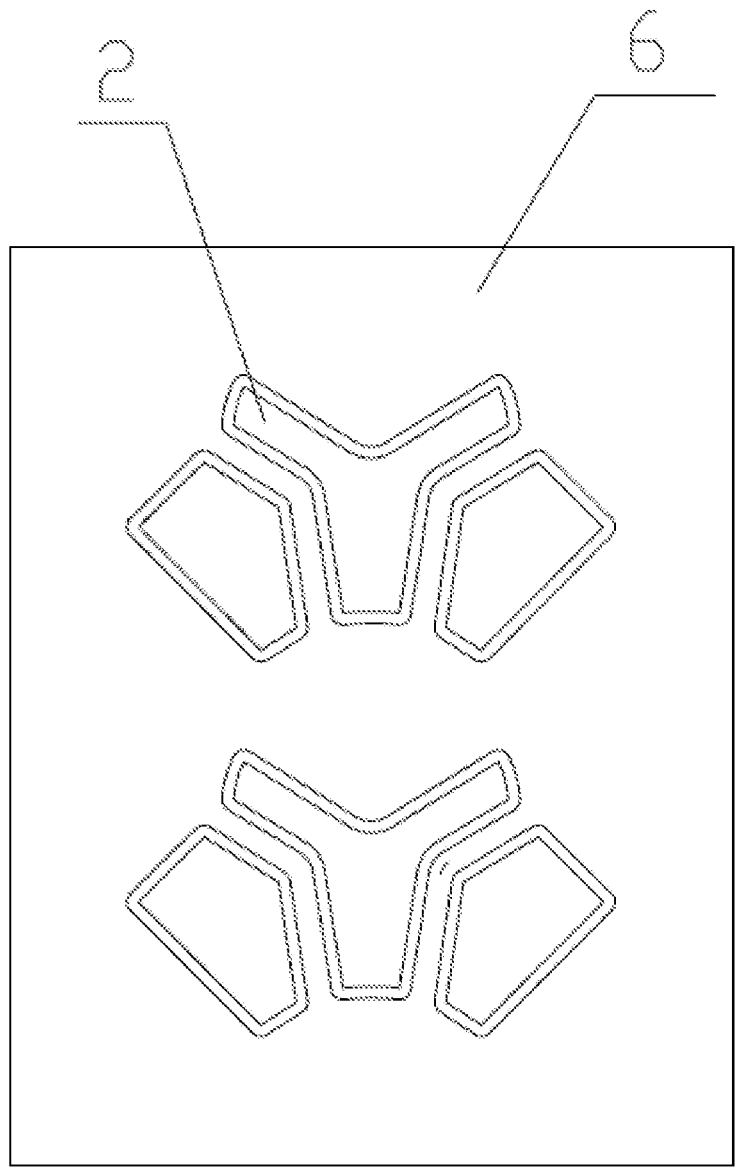
Figure 19:
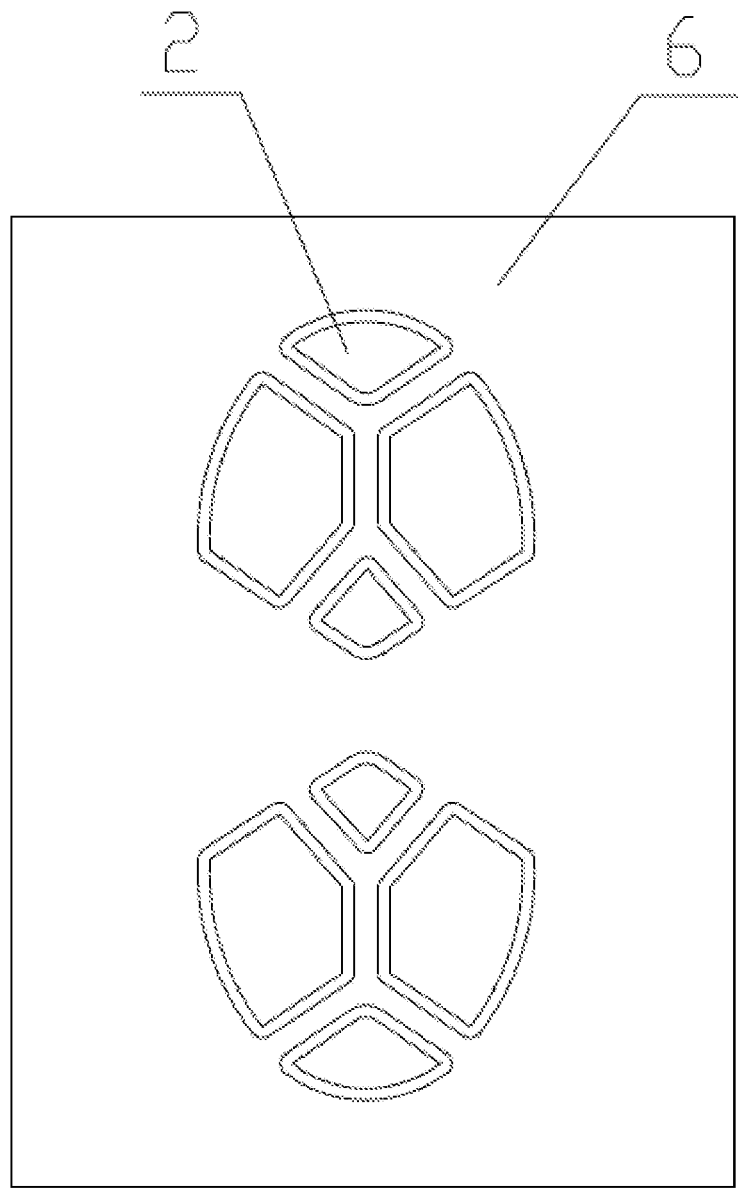
Figure 20:
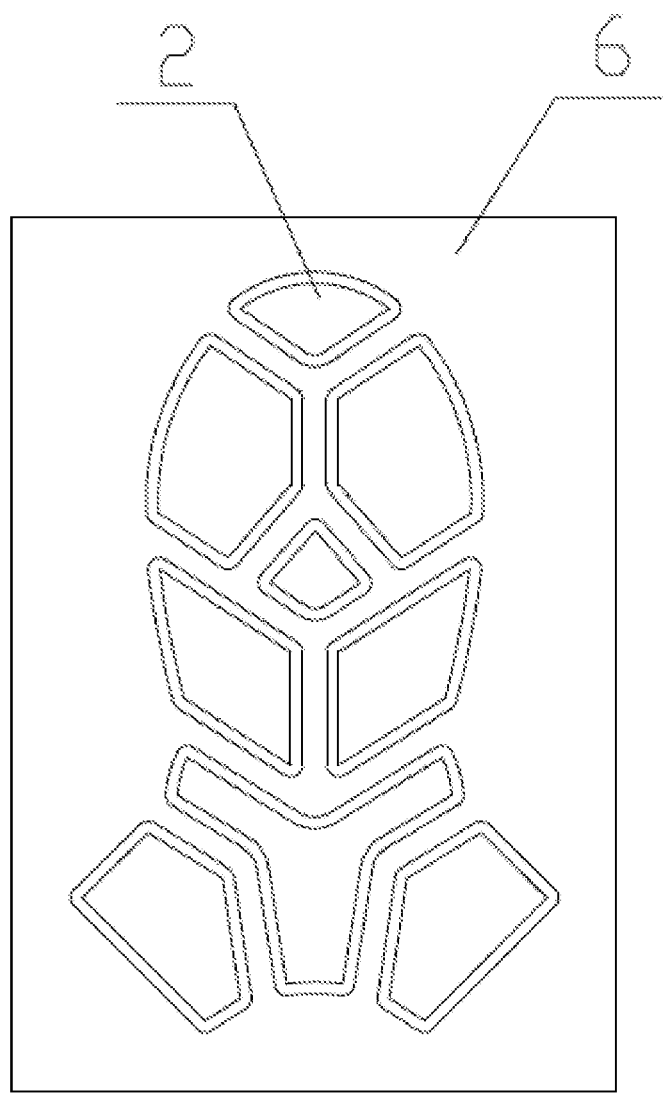
Figure 21:
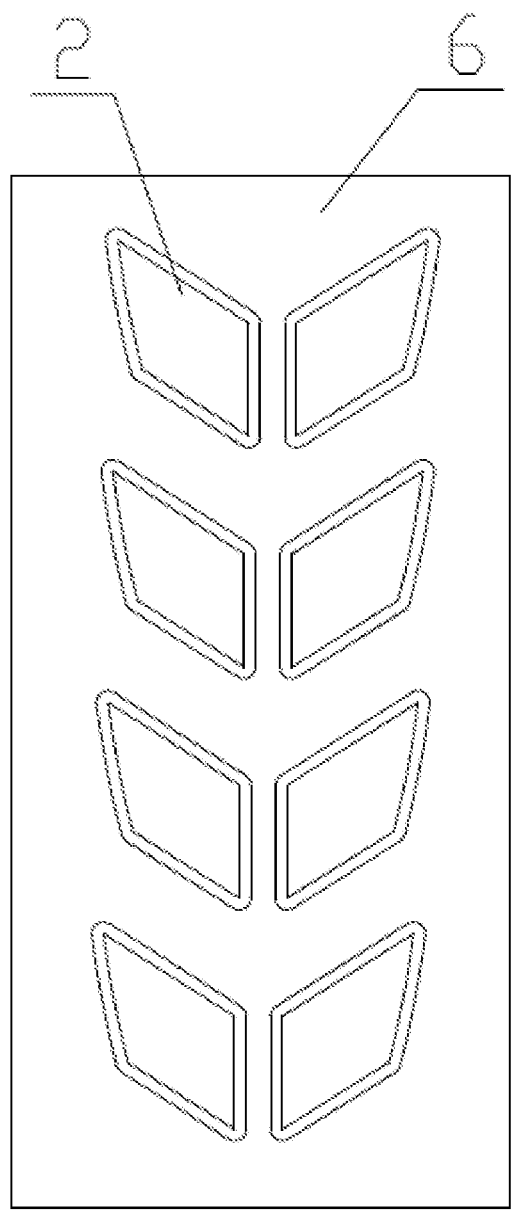
FIG. 21 is a structural view of a fourth kind of protective pad formed by combining two or more paddings made by the formation mold shown in FIG. 17.

In a further example, the paddings 2 made according to the formation mold 8 shown in FIG. 17 can be combined to form the protective pads shown in FIGS. 18-21, wherein, the protective pads shown in FIG. 18 are for use at two sides of the waist portion of sportswear; the protective pads shown in FIG. 19 are for use at the shoulder portion and the knee portion of sportswear; the protective pad shown in FIG. 20 is for use at the back portion of sportswear; the protective pads shown in FIG. 21 are for use at the front and back sides of the waistline of sportswear.

The above detailed description shows the preferred embodiments of the present invention. However, the embodiments of the present invention should not be limited by the above detailed description. Other changes, modifications, replacements, combinations and simplifications without deviating from the essence and principle of the present invention should be considered alternative configurations with equivalent technical effects and thus should fall within the scope of protection fo the present invention.

What is claimed is:

1. A manufacturing method of a protective pad for sportswear, comprising a plurality of independent paddings, and each of the independent paddings comprising more than one layer each formed by a spongy piece; said manufacturing method comprises the following steps:
   using spongy materials to make the independent paddings, comprising the following steps:
   deciding a thickness of each layer of each independent padding; choosing the spongy materials for each layer, wherein the spongy materials chosen for each layer have a thickness corresponding to the thickness decided for the corresponding layer; cutting the spongy materials chosen for each layer into a shape that corresponds to the corresponding layer by using a laser cutting device, so that the spongy materials chosen for each layer form the corresponding spongy piece after cutting; forming each independent padding by stacking up spongy pieces of all the layers of each independent padding; wherein,
   the step of forming each independent padding by stacking up spongy pieces of all the layers of each independent padding comprises the following steps:
   making each of a plurality of positioning boards by cutting out positional through openings from a flat board by using the laser cutting device, wherein the positional through openings of each positioning board correspond to positions, shapes and sizes of the spongy pieces which belong to respective same layers among the independent paddings;
   laying a first positioning board on a heat press mold in accordance with predetermined positioning references; placing first layers of spongy pieces of the independent paddings into the positional through openings of the first positioning board;
   after placing the first layers of spongy pieces, taking away the first positioning board;
   laying a second positioning board on the heat press mold in accordance with predetermined positioning references; placing second layers of spongy pieces of the independent paddings;
   repeating such procedures of taking away a previous positioning board, laying a subsequent positioning board on the heat press mold in accordance with predetermined positioning references and then placing subsequent layers of spongy pieces until all layers of spongy pieces are stacked up; wherein
   the spongy pieces stacked up in each independent padding are stacked up according to a sequence based on their surface areas from small to large, thereby configuring peripheries of each independent padding to have at least one stepped portion;
   choosing more than one of the independent paddings being made according to a predetermined configuration of the protective pad for sportswear desired to be made; laying a first fabric piece on the heat press mold which contains cavities for accommodating the more than one of the independent paddings, and then placing the more than one of the independent paddings into the cavities respectively; and after that laying a second fabric piece over the more than one of the independent paddings; applying glues between the first fabric piece, the second fabric piece and the more than one of the independent paddings; finally, adhering the first fabric piece, the second fabric piece and the more than one of the independent paddings by heat pressing using heat press formation devices, thereby forming the protective pad for sportswear.

2. The manufacturing method of a protective pad for sportswear according to claim 1, wherein before laying the first fabric piece, laying a press layer, wherein through openings that match with the shapes of the independent paddings are provided on the press layer, and peripheries of the through openings align with peripheries of the cavities of the heat press mold.

3. A manufacturing method of a protective pad for sportswear, comprising the following steps:
   making a plurality of independent paddings using spongy materials;
   choosing more than one of the independent paddings being made according to a predetermined configuration of the protective pad for sportswear desired to be made;
   laying a first fabric piece on a heat press mold having cavities for accommodating the more than one of the independent paddings, and then placing the more than one of the independent paddings into the cavities respectively; and after that laying a second fabric piece over the more than one of the independent paddings; applying glues between the first fabric piece, the second fabric piece and the more than one of the independent paddings; finally, adhering the first fabric piece, the second fabric piece and the more than one of the independent paddings by heat pressing using heat press formation devices; thereby forming the protective pad for sportswear; wherein before laying the first fabric piece, laying a press layer, wherein through openings that match with the shapes of the more than one of the independent paddings respectively are provided on the press layer, and peripheries of the through openings align with peripheries of the cavities of the heat press mold; wherein the step of making the plurality of independent paddings comprises the following steps:

cutting out spongy blanks each having a shape corresponding to the largest cross sectional area of a corresponding independent padding intended to be made;

providing plurality of cavities each having stepped portions on a formation mold for forming the more than one of the independent paddings, wherein shapes of the cavities each having stepped portions match with shapes of the more than one of the independent paddings respectively, and each cavity corresponds to a respective shape of a corresponding independent padding;

placing the spongy blanks into the cavities respectively, and then activating the heat press formation devices to shape the spongy blanks by heat pressing to configure peripheries of the spongy blanks to have stepped portions corresponding to the stepped portions of the cavities into which the spongy blanks are placed, thereby obtaining the more than one of the independent paddings each having stepped portions.

4. The manufacturing method of a protective pad for sportswear according to claim 3, wherein the formation mold is formed by plurality of mold units; each of the mold units contains one of said plurality of cavities provided on the formation mold.

5. A protective pad for sportswear obtained according to the manufacturing method of protective pad for sportswear of claim 1, wherein the protective pad is formed by said more than one of the independent paddings arranged according to a predetermined positional arrangement and adhered to fabric pieces, wherein the fabric pieces comprise the first fabric piece and the second fabric piece; the more than one of the independent paddings are positioned between the first fabric piece and the second fabric piece; the peripheries of each independent padding are formed as stepped portions.

6. A protective pad for sportswear obtained according to the manufacturing method of protective pad for sportswear of claim 3, wherein the protective pad is formed by said more than one of the independent paddings arranged according to a predetermined positional arrangement and adhered to fabric pieces, wherein the fabric pieces comprise the first fabric piece and the second fabric piece; the more than one of the independent paddings are positioned between the first fabric piece and the second fabric piece; peripheries of each independent padding are formed as stepped portions.

7. The protective pad for sportswear according to claim 5, wherein a press layer is provided on the first fabric piece; the press layer spreads over areas between said more than one of the independent paddings; peripheries of through openings provided on the press layer align with peripheries of the more than one of the independent paddings;

plurality of ventilation pores are provided on the protective pad; each of said more than one of the independent paddings is formed by layers of the spongy pieces adhered together.

8. The protective pad for sportswear according to claim 6, wherein the press layer is provided on the first fabric piece; the press layer spreads over areas between said more than one of the independent paddings; peripheries of through openings provided on the press layer align with peripheries of the more than one of the independent paddings;

plurality of ventilation pores are provided on the protective pad; each of said more than one of the independent paddings is formed by a single piece of spongy blank via heat pressing.

* * * * *